US012631045B2

(12) United States Patent
Mai

(10) Patent No.: US 12,631,045 B2
(45) Date of Patent: May 19, 2026

(54) LOCKSET AND PULL-TYPE HOUSE

(71) Applicant: Zuer Mai, Dongguan City (CN)

(72) Inventor: Zuer Mai, Dongguan City (CN)

( * ) Notice: Subject to any disclaimer, the term of this patent is extended or adjusted under 35 U.S.C. 154(b) by 0 days.

(21) Appl. No.: 19/332,309

(22) Filed: Sep. 18, 2025

(65) Prior Publication Data

US 2026/0117555 A1 Apr. 30, 2026

Related U.S. Application Data

(63) Continuation-in-part of application No. 18/933,077, filed on Oct. 31, 2024, now abandoned.

(51) Int. Cl.

| | |
|---|---|
| ***E05B 15/04*** | (2006.01) |
| ***E05B 17/00*** | (2006.01) |
| ***E05B 65/00*** | (2006.01) |
| *E05B 83/44* | (2014.01) |

(52) U.S. Cl.

CPC .......... *E05B 15/04* (2013.01); *E05B 17/0041* (2013.01); *E05B 65/00* (2013.01); *E05B 2015/0437* (2013.01); *E05B 83/44* (2013.01)

(58) Field of Classification Search

CPC .. E05B 17/0041; E05B 17/0054; E05B 83/44; E05B 2015/0437; E05B 15/04; E05B 47/36; E05B 47/38; E05B 77/36; E05B 77/38

See application file for complete search history.

(56) References Cited

U.S. PATENT DOCUMENTS

| | | | | |
|---|---|---|---|---|
| 9,803,390 | B1 * | 10/2017 | Bowling | E05B 37/08 |
| 11,035,152 | B2 | 6/2021 | Avganim | |
| 12,012,783 | B2 | 6/2024 | Yang | |
| 12,158,028 | B2 | 12/2024 | Wu | |
| 2015/0279137 | A1 * | 10/2015 | Bacon | E05B 81/66 70/278.1 |
| 2018/0016810 | A1 * | 1/2018 | Bacon | E05B 81/66 |
| 2020/0308880 | A1 * | 10/2020 | Lin | E05B 47/0657 |
| 2024/0151071 | A1 * | 5/2024 | Zhang | E05B 81/18 |
| 2024/0328214 | A1 * | 10/2024 | Chen | E05B 47/0012 |

FOREIGN PATENT DOCUMENTS

| | | | | |
|---|---|---|---|---|
| CN | 110778231 A * | 2/2020 | | E05B 79/22 |
| CN | 219262053 U * | 6/2023 | | |

OTHER PUBLICATIONS

Espacenet machine generated translation of CN 110778231 A. (Year: 2025).*

* cited by examiner

*Primary Examiner* — Kristina R Fulton
*Assistant Examiner* — Emily G. Brown
(74) *Attorney, Agent, or Firm* — Ricky Lam

(57) ABSTRACT

Provided is a lockset, which includes a shell, a first lock tongue, a second lock tongue, a driving assembly, a transmission assembly and a damping assembly; the shell includes a first housing and a base; the base is provided with a first mounting hole; the first lock tongue is arranged on the base; the second lock tongue is arranged on the base, the second lock tongue is located on a side of the first lock tongue close to the first mounting hole; and the damping assembly is arranged in the first mounting hole, and a part of the damping assembly extends out of the first mounting hole and is abutted against the second lock tongue. The damping assembly can generate resistance to act on the second lock tongue, limiting the second lock tongue from retracting into the lockset, thereby improving the stability of the lockset.

15 Claims, 7 Drawing Sheets

LOCKSET AND PULL-TYPE HOUSE

FIELD OF THE INVENTION

The present application relates to the technical field of locksets, and in particular, to a lockset and a pull-type house.

BACKGROUND OF THE INVENTION

Pull-type houses are widely applied in outdoor camping and mobile living due to their flexibility and portability. During a driving process of the pull-type house, a lock tongue of the lockset retracts into the lockset due to the violent vibration of a vehicle, resulting in low stability of the lockset and making a door body of the pull-type house easily opened accidentally.

SUMMARY OF THE INVENTION

Embodiments of the present application provide a lockset and a pull-type house, which can solve the problem that a door body of a pull-type house is prone to be accidentally opened due to poor stability of a lockset.

Technical Solution

In a first aspect, an embodiment of the present application provides a lockset. The lockset includes:

- a shell, the shell including a first housing and a second housing connected to the first housing;
- a base, the base being arranged in the shell, and the base being provided with a first mounting hole;
- a first lock tongue, the first lock tongue being arranged on the base, and a part of the first lock tongue extending out of the shell;
- a second lock tongue, the second lock tongue being arranged on the base, the second lock tongue being located on a side of the first lock tongue close to the first mounting hole, and a part of the second lock tongue extending out of the shell;
- a driving assembly, the driving assembly being arranged on the base;
- a transmission assembly, the transmission assembly being connected to the driving assembly and the second lock tongue, and the transmission assembly being used to drive a part of the second lock tongue to extend out of the lockset or to drive a part of the second lock tongue located outside the lockset to retract into the lockset under the drive of the driving assembly; and
- a damping assembly, the damping assembly being arranged in the first mounting hole, and a part of the damping assembly extending out of the first mounting hole and being abutted against the second lock tongue.

In a second aspect, an embodiment of the present application provides a pull-type house, including a door body and the lockset, wherein the lockset is mounted on the door body.

Beneficial Effects

In the embodiments of the present application, a lockset is provided. The lockset includes a shell, a base, a first lock tongue, a second lock tongue, a driving assembly, a transmission assembly and a damping assembly; the shell includes a first housing and a second housing connected to the first housing; the first lock tongue is arranged on the base, and a part of the first lock tongue extends out of the shell; the second lock tongue is arranged on the base, the second lock tongue is located on a side of the first lock tongue close to the first mounting hole, and a part of the second lock tongue extends out of the shell; the driving assembly is arranged on the base; the transmission assembly is connected to the driving assembly and the second lock tongue, and the transmission assembly is used to drive a part of the second lock tongue to extend out of the lockset or to drive a part of the second lock tongue located outside the lockset to retract into the lockset under the drive of the driving assembly; and the damping assembly is arranged in the first mounting hole, and a part of the damping assembly extends out of the first mounting hole and is abutted against the second lock tongue. Therefore, the damping assembly can generate a preset size of resistance to act on the second lock tongue, and this resistance can limit the second lock tongue from retracting into the lockset if a vehicle vibrates violently, thereby improving the stability of the lockset and being conducive to solving the problem that the door body of the pull-type house is prone to be opened accidentally.

Figure 1:
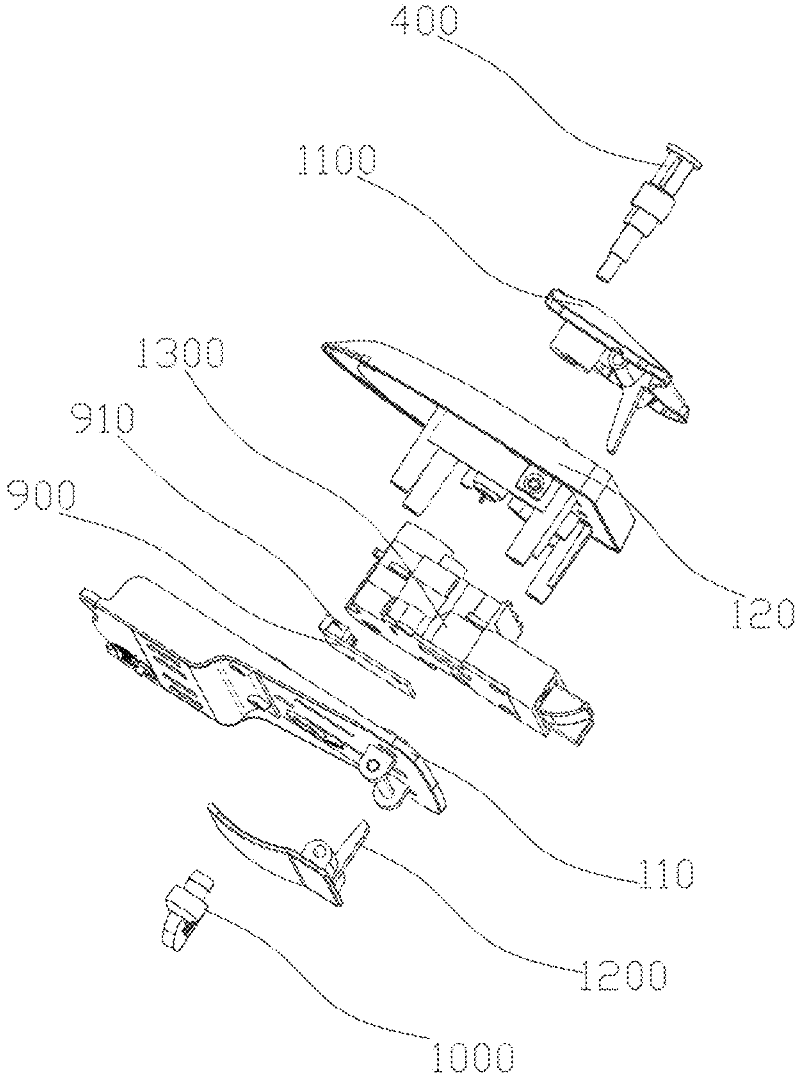
FIG. 1 is an exploded view of a lockset of the present application.

Reference symbols represent the following components: 10—lockset; 100—shell; 110—first housing; 120—second housing; 121—third mounting hole; 200—first lock tongue; 300—second lock tongue; 400—driving assembly; 410—key lock; 411—first action portion; 420—latch guide shaft; 421—first connecting hole; 4211—limiting protrusion; 500—transmission assembly; 510—gear transmission part; 511—first gear; 512—second gear; 520—linkage transmission part; 521—first linkage; 522—second linkage; 600—damping assembly; 610—first elastic member; 620—first action member; 700—limiting assembly; 710—second elastic member; 720—first limiting member; 800—driving motor; 900—control circuit board; 910—wireless communication module; 1000—operating handle; 1010—operating portion; 1020—connecting portion; 1100—first grip; 1110—first main body portion; 1120—second action portion;

1200—second grip; 1210—second main body portion; 1220—third action portion; 1300—base; 1310—first mounting hole; 1320—second mounting hole; and 1330—bump.

DETAILED DESCRIPTION OF SOME EMBODIMENTS

A first embodiment of the present application provides a lockset 10. Referring to FIGS. 1, 2, 3, 4, and 5, the lockset 10 includes a shell 100, a base 1300, a first lock tongue 200, a second lock tongue 300, a driving assembly 400, a transmission assembly 500 and a damping assembly 600; the shell 100 includes a first housing 110 and a second housing 120 connected to the first housing; the base 1300 is provided with a first mounting hole 1310; the first lock tongue 200 is arranged on the base 1300, and a part of the first lock tongue extends out of the shell; the second lock tongue 300 is arranged on the base 1300, the second lock tongue 300 is located on a side of the first lock tongue 200 close to the first mounting hole 1310, and a part of the second lock tongue extends out of the shell; the driving assembly 400 is arranged on the base 1300; the transmission assembly 500 is connected to the driving assembly 400 and the second lock tongue 300, and the transmission assembly 500 is used to drive a part of the second lock tongue 300 to extend out of the lockset 10 or to drive a part of the second lock tongue 300 located outside the lockset 10 to retract into the lockset 10 under the drive of the driving assembly 400; and the damping assembly 600 is arranged in the first mounting hole 1310, and a part of the damping assembly 600 extends out of the first mounting hole 1310 and is abutted against the second lock tongue 300.

Pull-type houses are widely applied in outdoor camping and mobile living due to their flexibility and portability. During a driving process of the pull-type house, a lock tongue of the lockset 10 retracts into the lockset 10 due to the violent vibration of a vehicle, resulting in low stability of the lockset 10 and making a door body of the pull-type house easily opened accidentally. Therefore, the embodiment of the present application provides a lockset 10. Since it is provided that the lockset 10 includes a base 1300, a second lock tongue 300 and a damping assembly 600, wherein the base 1300 is provided with a first mounting hole 1310, the damping assembly 600 is arranged in the first mounting hole 1310, and a part of the damping assembly 600 extends out of the first mounting hole 1310 and is abutted against the second lock tongue 300, the damping assembly 600 can generate a preset size of resistance to act on the second lock tongue 300, and this resistance can limit the second lock tongue 300 from retracting into the lockset 10 if a vehicle vibrates violently, thereby improving the stability of the lockset 10 and being conducive to solving the problem that the door body of the pull-type house is prone to be opened accidentally.

Figure 5:
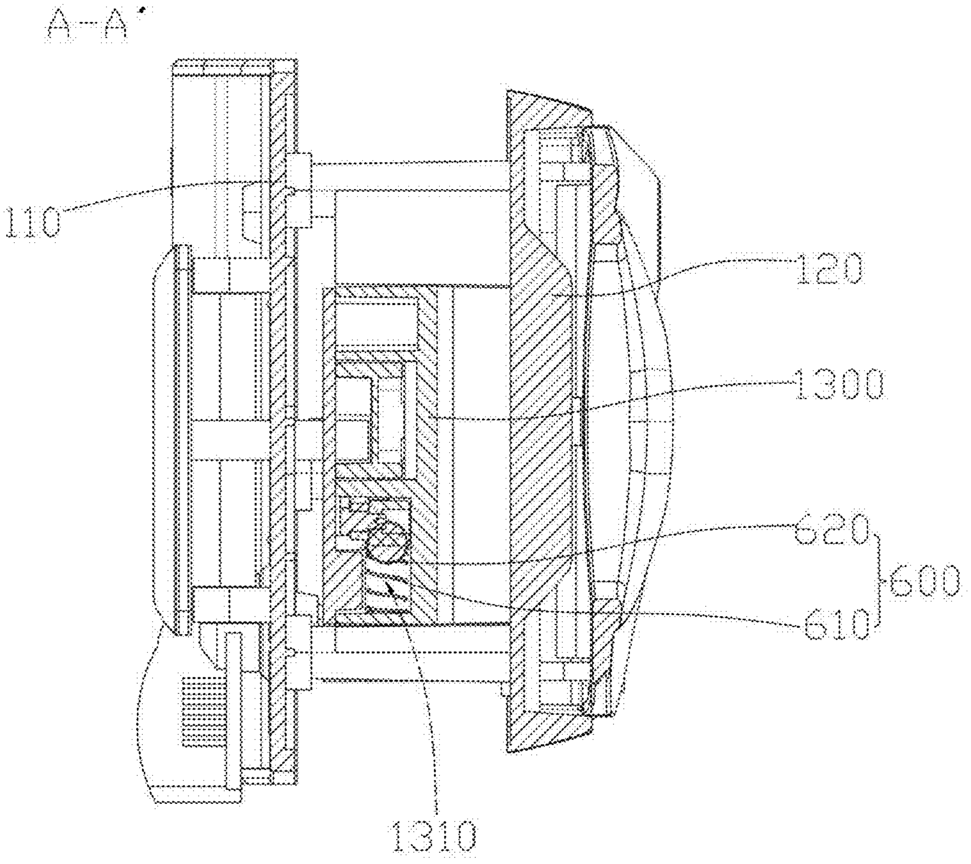
FIG. 5 is a sectional view of the lockset shown in FIG. 4 taken along A-A'.

In the present embodiment, referring to FIG. 5, the damping assembly 600 includes a first elastic member 610 and a first action member 620, wherein the first elastic member 610 is arranged in the first mounting hole 1310, one end of the first elastic member 610 is connected to an inner wall of the first mounting hole 1310, the other end of the first elastic member 610 is connected to the first action member 620, and a part of the first action member 620 extends out of the first mounting hole 1310 and is abutted against the lock tongue. Since it is provided that the damping assembly 600 includes the first elastic member 610 and the first action member 620, wherein the first elastic member 610 is arranged in the first mounting hole 1310, one end of the first elastic member 610 is connected to the inner wall of the first mounting hole 1310, the other end of the first elastic member 610 is connected to the first action member 620, and a part of the first action member 620 extends out of the first mounting hole 1310 and is abutted against the second lock tongue 300, the first elastic member 610 can provide an elastic force and transfer the elastic force onto the first action member 620, so that the first action member 620 can resist the second lock tongue 300 to provide resistance to prevent the second lock tongue 300 from retracting into the lockset 10, thereby improving the stability of the lockset 10.

In the present embodiment, the first elastic member 610 is a spring.

Figure 7:
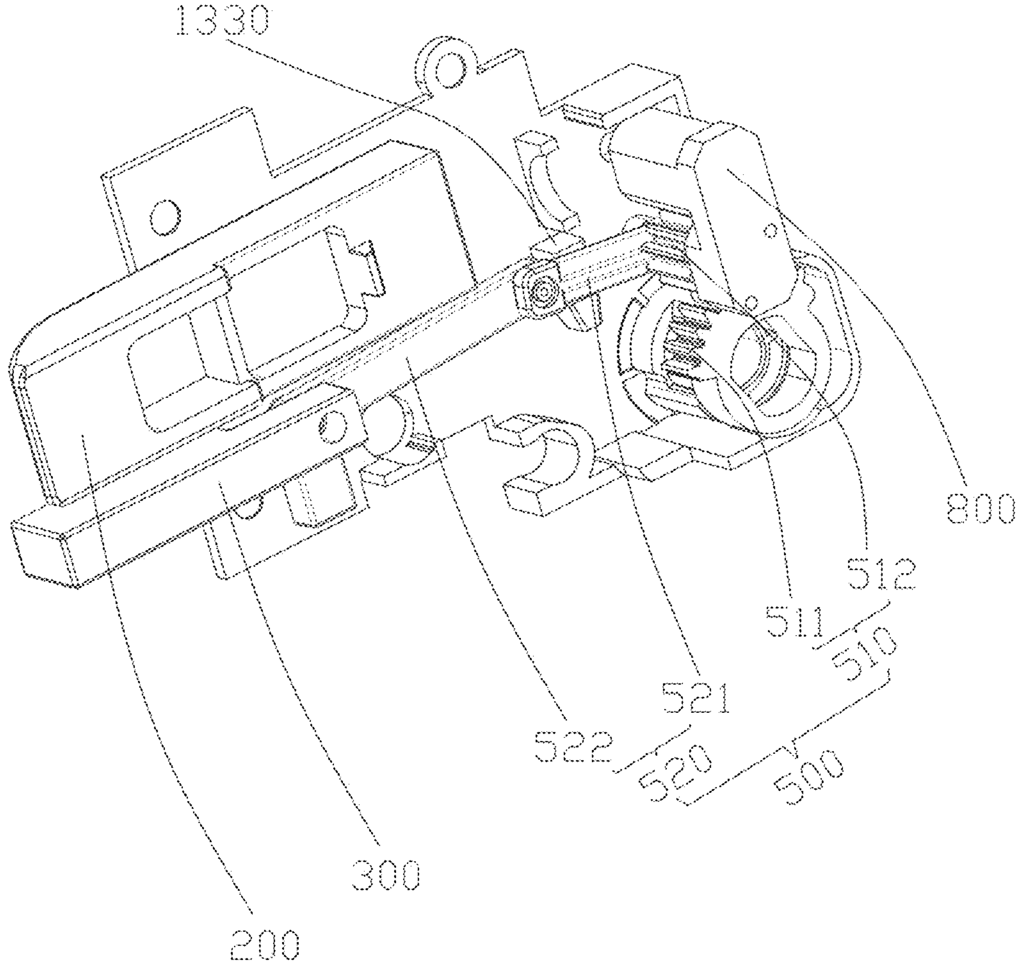
FIG. 7 is a schematic diagram of a connecting relationship among a transmission assembly, a driving motor and a second lock tongue of the lockset of the present application.

In the present embodiment, referring to FIG. 7, the transmission assembly 500 includes a gear transmission part 510 and a linkage transmission part 520, wherein the linkage transmission part 520 is connected to the second lock tongue 300 and the gear transmission part 510 in a transmission manner, and the driving assembly 400 is connected to the gear transmission part 510 in a transmission manner. Since it is provided that the transmission assembly 500 includes the gear transmission part 510 and the linkage transmission part 520, wherein the linkage transmission part 520 is connected to the second lock tongue 300 and the gear transmission part 510 in a transmission manner, and the driving assembly 400 is connected to the gear transmission part 510 in a transmission manner, the transmission assembly 500 can drive a part of the second lock tongue 300 located outside the lockset 10 to retract into the lockset 10 or drive a part of the second lock tongue 300 located inside the lockset 10 to extend out of the lockset 10 under the action of the driving assembly 400, thereby ensuring that the lockset 10 functions as a door lock.

In the present embodiment, referring to FIG. 7, the gear transmission part 510 includes a first gear 511 and a second gear 512, wherein the first gear 511 is connected to the driving assembly 400, the second gear 512 is connected to the first gear 511 in a transmission manner, one end of the linkage transmission portion 520 is connected to the second gear 512 in a transmission manner, and the gear transmission part 510 consisting of the first gear 511 and the second gear 512 can provide a constant and reliable instantaneous transmission ratio.

In the present embodiment, referring to FIG. 7, the linkage transmission part 520 includes a first linkage 521 and a second linkage 522, wherein one end of the first linkage 521 is connected to the second gear 512 in a transmission manner, one end of the second linkage 522 is pivotally connected to the other end of the first linkage 521, and the other end of the second linkage 522 is pivotally connected to the second lock tongue 300. Since it is provided that the linkage transmission part 520 includes the first linkage 521 and the second linkage 522, wherein one end of the first linkage 521 is connected to the second gear 512 in a transmission manner, one end of the second linkage 522 is pivotally connected to the other end of the first linkage 521, the other end of the second linkage 522 is pivotally connected to the second lock tongue 300, and the linkage transmission part 520 consisting of the first linkage 521 and the second linkage 522 can be coordinated with the first gear 511 and the second gear 512, the transmission assembly 500 can move more smoothly, which is conducive to reducing the jamming or impact of the lock tongues during movement, and ensuring that the lockset 10 is smoother in the process of opening and closing the lockset.

In the present embodiment, referring to FIG. 7, the first gear 511 includes a first disc body portion and a first convex tooth portion arranged on a part of a side wall of the first disc body portion, and the second gear 512 includes a second disc body portion and a second convex tooth portion arranged on a side wall of the second disc body portion, wherein the first disc body portion is connected to the latch guide shaft 420, the first convex tooth portion is meshed with the second convex tooth portion, and the second disc body portion is connected to the linkage transmission part in a transmission manner.

Figure 6:
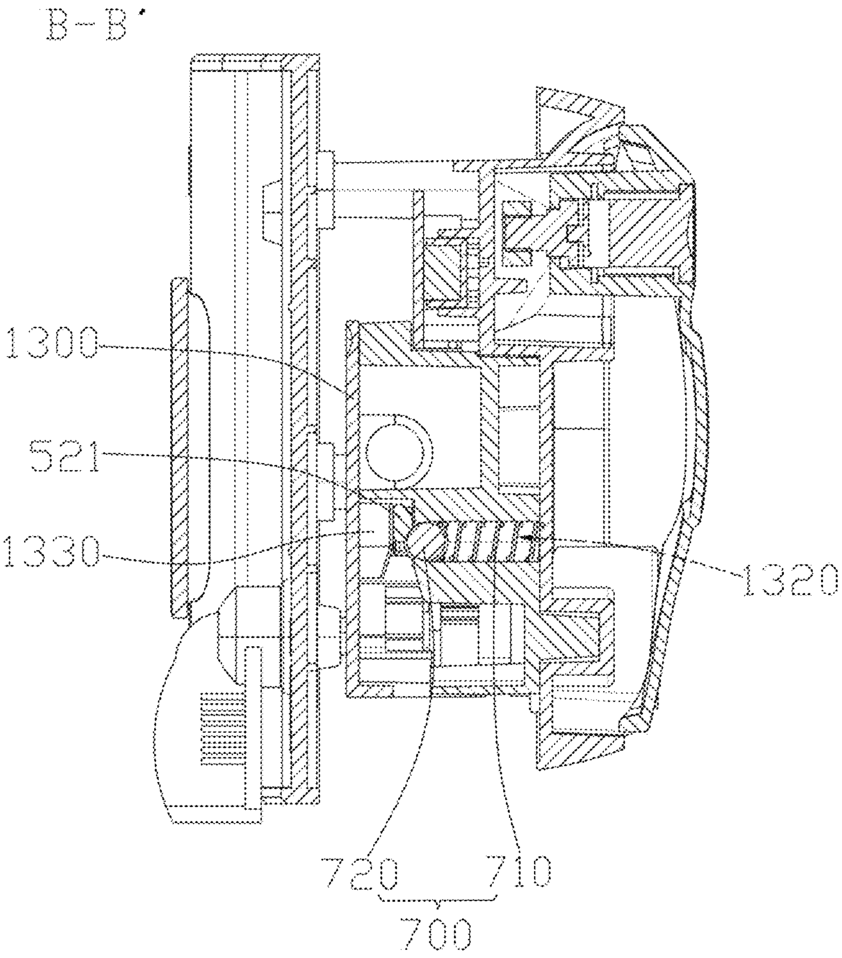
FIG. 6 is a sectional view of the lockset shown in FIG. 4 taken along B-B'.

In the present embodiment, referring to FIG. 6, the base 1300 is provided with a second mounting hole 1320, and the second mounting hole 1320 is located on a side of the first linkage 521 away from the first lock tongue 200; and the lockset 10 further includes a limiting assembly 700, wherein the limiting assembly 700 is arranged in the second mounting hole 1320, and a part of the limiting assembly 700 extends out of the second mounting hole 1320 and is abutted against the first linkage 521. Since it is provided that the base 1300 is provided with the second mounting hole 1320, and the second mounting hole 1320 is located on the side of the first linkage 521 away from the first lock tongue 200; and the lockset 10 further includes the limiting assembly 700, wherein the limiting assembly 700 is arranged in the second mounting hole 1320, and a part of the limiting assembly 700 extends out of the second mounting hole 1320 and is abutted against the first linkage 521, the risk of jamming of the lockset 10 caused by excessive tilt of the first linkage 521 during movement can be reduced.

In the present embodiment, referring to FIG. 6 and FIG. 7, the limiting assembly 700 is close to a pivotal connection between the first linkage 521 and the second linkage 522. Since it is provided that the limiting assembly 700 is close to the pivotal connection between the first linkage 521 and the second linkage 522, the stability of the linkage transmission portion 520 under stress can be enhanced, thereby improving the reliability of the lockset 10.

In the present embodiment, referring to FIG. 6, the limiting assembly 700 includes a second elastic member 710 and a first limiting member 720, wherein the second elastic member 710 is arranged in the second mounting hole 1320, one end of the second elastic member 710 is connected to an inner wall of the first mounting hole 1320, the other end of the second elastic member 710 is connected to the first limiting member 720, and a part of the first limiting member 720 extends out of the second mounting hole 1320 and is abutted against the first linkage 521. Since it is provided that the limiting assembly 700 includes the second elastic member 710 and the first limiting member 720, wherein the second elastic member 710 is arranged in the second mounting hole 1320, one end of the second elastic member 710 is connected to the inner wall of the second mounting hole 1320, the other end of the second elastic member 710 is connected to the first limiting member 720, and a part of the first limiting member 720 extends out of the second mounting hole 1320 and is abutted against the first linkage 521, the second elastic member 710 can effectively absorb the vibration generated by the first linkage 521 during movement to improve the reliability of the lockset 10, and can avoid the risk of jamming of the lockset 10 caused by excessive lateral movement of the first linkage 521.

In the present embodiment, the second elastic member 710 is a spring.

In the present embodiment, referring to FIG. 6, a bump 1330 is arranged on a side of the base 1300 close to the first linkage 521, and the bump 1330 is directly opposite the first limiting member 720, wherein a part of the first linkage 521 is located in contact with the first limiting member 720 and the bump 1330, and both sides of the first linkage 521 are in contact with the first limiting member 720 and the bump 1330, respectively. Since it is provided that the bump 1330 is arranged on the side of the base 1300 close to the first linkage 521, and the bump 1330 is directly opposite the first limiting member 720, wherein a part of the first linkage 521 is located in contact with the first limiting member 720 and the bump 1330, and both sides of the first linkage 521 are in contact with the first limiting member 720 and the bump 1330, respectively, the bump 1330 can play a limiting role on the first linage 521 in a lateral direction, avoid the lateral movement of the first linkage 521 in a direction close to the first housing 110, avoid the rebound of the first linkage, and improve the stability of the linkage transmission structure, thereby improving the reliability of the lockset 10.

In the present embodiment, the thickness of an edge area on a surface of the first linkage 521 close to the first limiting member 720 is less than the thickness of a middle area on a surface of the first linkage 521 close to the first limiting member 720.

Figure 11:
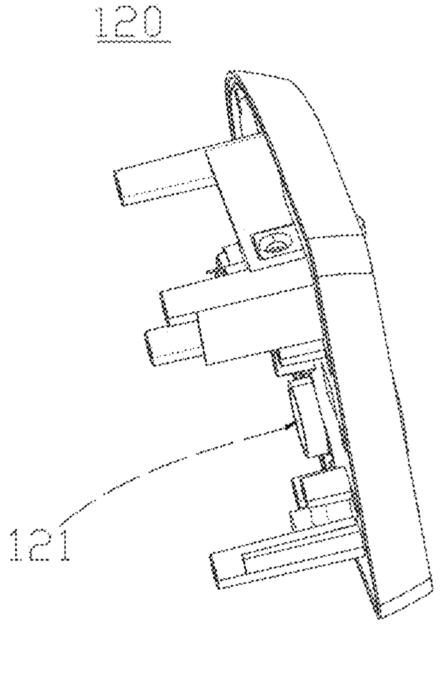
FIG. 11 is a schematic diagram of a second housing of a shell of the lockset of the present application.

In the present embodiment, referring to FIG. 1 and FIG. 11, the second housing is provided with a third mounting hole 121, wherein the driving assembly 400 is arranged in the third mounting hole 121; and the driving assembly 400 includes a key lock 410 and a latch guide shaft 420, wherein the key lock is arranged in the third mounting hole 121, the key lock 410 is connected to one end of the latch guide shaft 420, the key lock 410 is rotatably arranged at one end of the latch guide shaft 420 away from the first housing 110, and the second gear 512 is fixedly sleeved on the latch guide shaft 420. Since it is provided that the base 1300 is provided with the third mounting hole 121 which is located on a side of the base 1300 away from the first housing 110, wherein the driving assembly 400 is arranged in the third mounting hole 121; and the driving assembly 400 includes the key lock 410 and the latch guide shaft 420, wherein the latch guide shaft 420 is arranged in the third mounting hole 121, the latch guide shaft 420 is connected to the key lock 410, the key lock 410 is rotatably arranged at one end of the latch guide shaft 420 away from the first housing 110, and the second gear 512 is fixedly sleeved on the latch guide shaft 420, when a key is inserted into the key lock 410 and rotated, the latch guide shaft 420 can be driven to rotate to drive the transmission assembly 500 to operate, thereby driving a part of the second lock tongue 300 located outside the lockset 10 to retract into the lockset 10 or driving a part of the second lock tongue 300 located inside the lockset 10 to extend out of the lockset 10.

In the present embodiment, referring to FIG. 7, the driving assembly 400 is a driving motor 800, and an output end of the driving motor 800 is connected to the second gear 512 in a transmission manner. Since it is provided that the driving assembly 400 is the driving motor 800, and the output end of the driving motor 800 is connected to the second gear 512 in a transmission manner, the driving motor 800 can drive the transmission assembly 500 to operate, thereby driving a part of the second lock tongue 300 located outside the lockset 10 to retract into the lockset 10 or driving a part of the second lock tongue 300 located inside the lockset 10 to extend out of the lockset 10.

Figure 8:
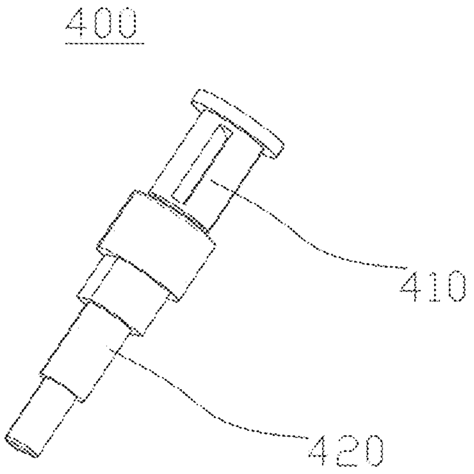
FIG. 8 is a schematic diagram of the driving assembly of the lockset of the present application.
Figure 9:
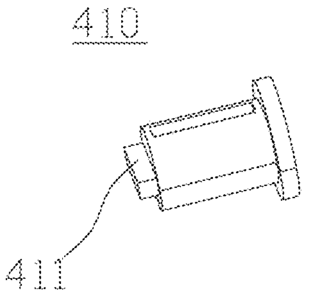
FIG. 9 is a schematic diagram of a key lock of the driving assembly of the lockset shown in FIG. 8.
Figure 10:
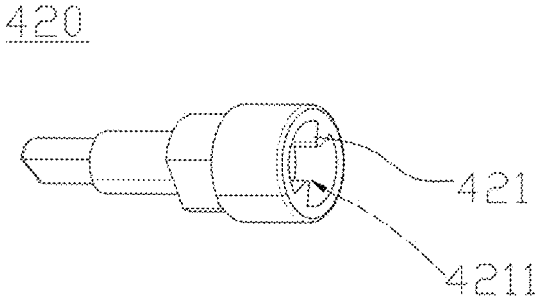
FIG. 10 is a schematic diagram of a latch guide shaft of the driving assembly of the lockset shown in FIG. 8.

In the present embodiment, referring to FIGS. 8, 9, and 10, a first connecting hole 421 is formed in a side of the latch guide shaft 420 close to the key lock 410, at least two limiting protrusions 4211 which are spaced apart are arranged in the first connecting hole 421, a first action portion 411 is extended from a side of the key lock 410 close to the latch guide shaft 420, and the first action portion 411 is located inside the first connecting hole 421; and when the key lock 410 is rotated, a side wall of the first action portion 411 is in contact with or detached from side walls of the limiting protrusions 4211. Since it is provided that the first connecting hole 421 is formed in the side of the latch guide shaft 420 close to the key lock 410, at least two limiting protrusions 4211 which are spaced apart are arranged in the first connecting hole 421, the first action portion 411 is extended from the side of the key lock 410 close to the latch guide shaft 420, and the first action portion 411 is located inside the first connecting hole 421; and when the key lock 410 is rotated, the side wall of the first action portion 411 is in contact with or detached from the side walls of the limiting protrusions 4211, the first action portion 411 can interact with the limiting protrusions 4211, thereby ensuring that the key lock 410 can drive the transmission assembly 500 to operate.

In the present embodiment, referring to FIG. 7, the lockset 10 further includes a driving motor 800, wherein an output end of the driving motor 800 is connected to the second gear 512 in a transmission manner. Since it is provided that the driving assembly 400 is the driving motor 800, wherein the output end of the driving motor 800 is connected to the second gear 512 in a transmission manner, the transmission assembly 500 can drive the transmission assembly 500 to operate, thereby driving a part of the second lock tongue 300 located outside the lockset 10 to retract into the lockset 10 or driving a part of the second lock tongue 300 located inside the lockset 10 to extend out of the lockset 10. It should be noted that when the driving assembly 400 includes the key lock 410 and the latch guide shaft 420, the lockset 10 may further include the driving motor 800, so as to achieve a variety of unlocking modes of the lockset 10. When the driving assembly 400 is the driving motor 800, the lockset 10 is not additionally provided with the driving motor 800.

In the present embodiment, referring to FIG. 1, the lockset 10 further includes a control circuit board 900, wherein the control circuit board 900 is arranged in the shell 100, the control circuit board 900 is electrically connected to the driving motor 800, the control circuit board 900 is provided with a wireless communication module 910, and the wireless communication module 910 is used to be in communication connection with a second Bluetooth module of an external terminal device. Since it is provided that the lockset 10 further includes the control circuit board 900, wherein the control circuit board 900 is arranged in the shell 100, the control circuit board 900 is electrically connected to the driving motor 800, the control circuit board 900 is provided with the wireless communication module 910, and the wireless communication module 910 is used to be in communication connection with an external device, a control signal emitted from the external device is advantageously transmitted to the wireless communication module 910, and the control circuit board 900 outputs the control signal to the driving motor 800, such that the driving motor 800 can drive the transmission assembly 500 to operate, so as to drive a part of the second lock tongue 300 located outside the lockset 10 to retract into the lockset 10 or drive a part of the second lock tongue 300 inside the lockset 10 to extend out of the lockset 10, thereby achieving the diversity of unlocking modes of the lockset 10.

In the present embodiment, the wireless communication module is a Bluetooth module.

In the present embodiment, the wireless communication module is an RF433 MHz wireless module.

Figure 3:
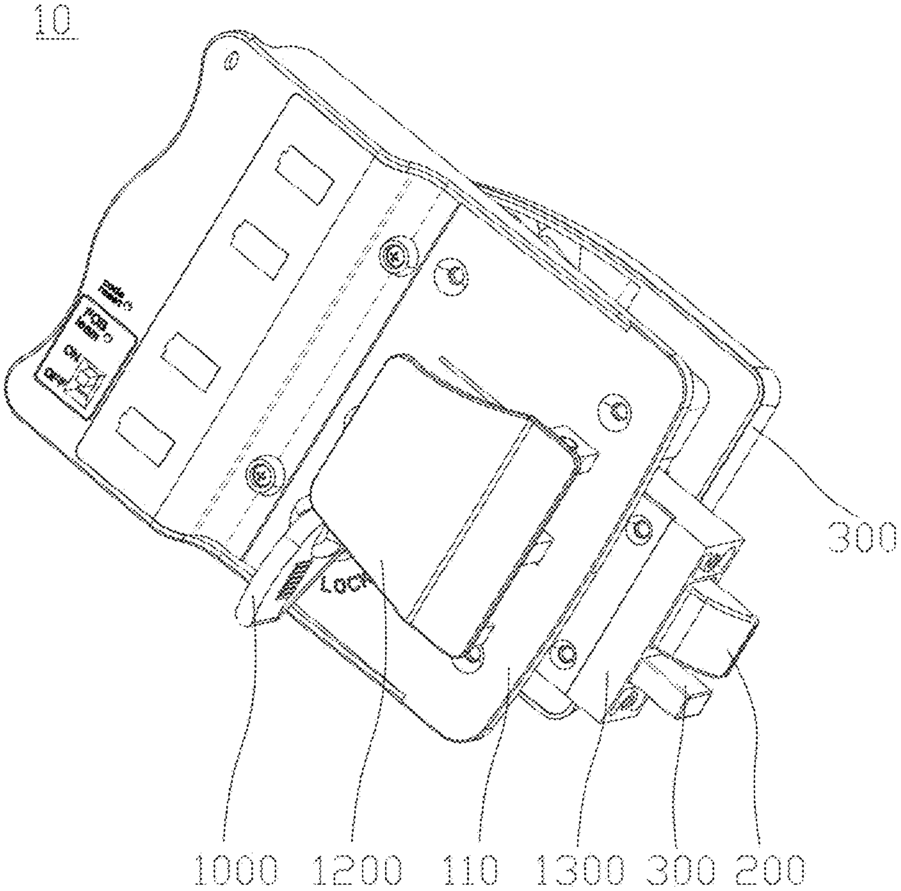
FIG. 3 is a three-dimensional view of the lockset shown in FIG. 2 from another perspective.
Figure 4:
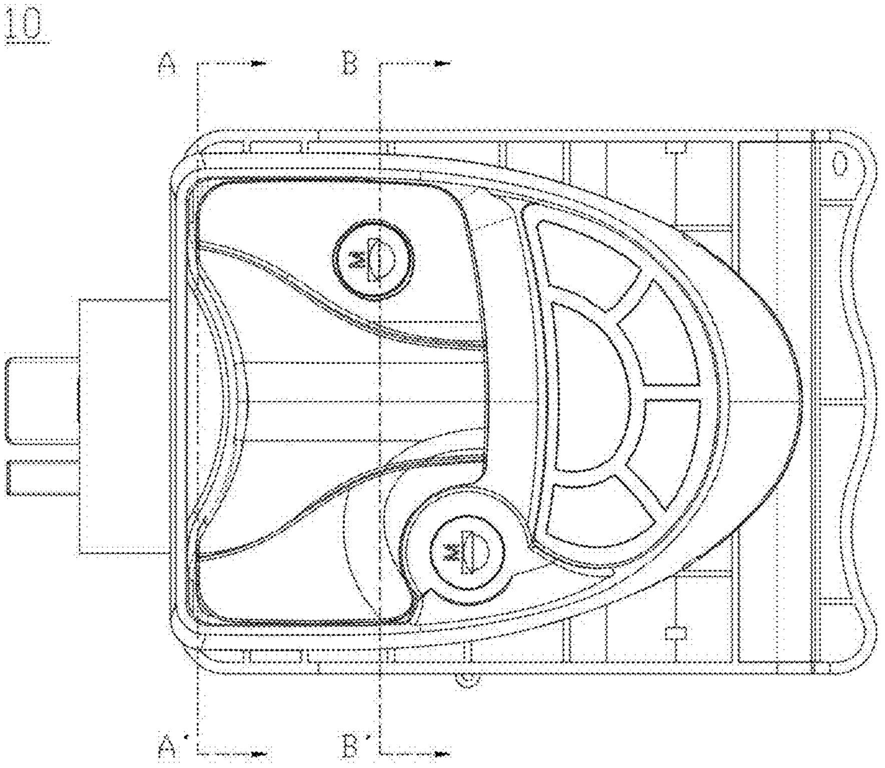
FIG. 4 is a top view of the lockset of the present application.

In the present embodiment, referring to FIG. 3, the lockset 10 further includes an operating handle 1000, wherein the operating handle 1000 is arranged on a side of the first housing 110 away from the base 1300, and a part of the operating handle 1000 passes through the first housing 110 and is connected to the latch guide shaft 420. Since it is provided that the lockset 10 further includes the operating handle 1000, wherein the operating handle 1000 is arranged on the side of the first housing 110 away from the base 1300, and a part of the operating handle 1000 passes through the first housing 110 and is connected to the latch guide shaft 420, the user can control the latch guide shaft 420 to rotate through the operating handle 1000 so as to drive the driving assembly 500 to operate.

It should be noted that the side of the lockset 10 where the operating handle 1000 is arranged is located on the inside of the pull-type house.

Figure 12:
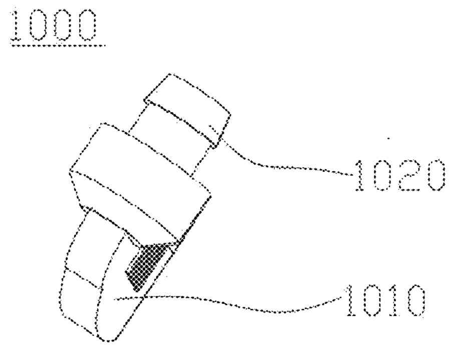
FIG. 12 is a schematic diagram of an operating handle of the lockset of the present application.

In the present embodiment, referring to FIG. 12, the operating handle 1000 includes an operating portion 1010 and a connecting portion 1020, wherein one end of the connecting portion 1020 is connected to the operating portion 1010, and the other end of the connecting portion 1020 passes through the first housing 110 and the latch guide shaft 420. Since it is provided that the operating handle 1000 includes the operating portion 1010 and the connecting portion 1020, wherein one end of the connecting portion 1020 is connected to the operating portion 1010, and the other end of the connecting portion 1020 passes through the first housing 110 and the latch guide shaft 420, the connecting portion 1020 can drive the latch guide shaft 420 to rotate when the operating handle 1000 is rotated, thereby driving the transmission assembly 500 to operate.

Figure 2:
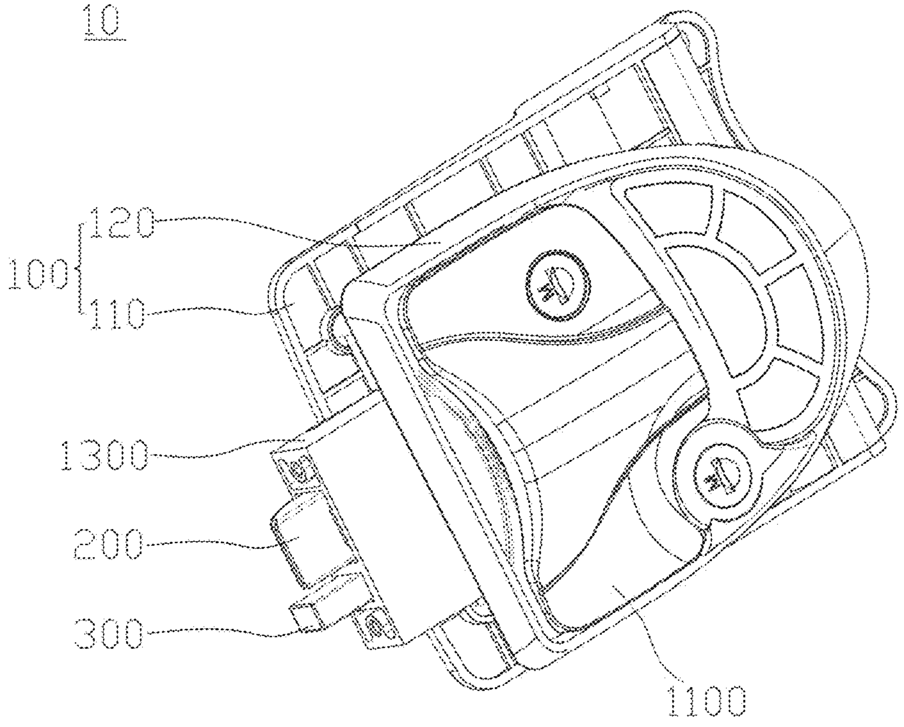
FIG. 2 is a three-dimensional view of the lockset of the present application.

In the present embodiment, referring to FIG. 2, the lockset 10 further includes a first grip 1100, wherein the first grip 1100 is arranged on a side of the second housing 120 away from the base 1300, the first grip 1100 is rotatably connected to the second housing 120, and a part of the first grip 1100 passes through the base 1300 and is connected to the first lock tongue 200. Since it is provided that the lockset 10 further includes the first grip 1100, wherein the first grip 1100 is arranged on a side of the base 1300 away from the first housing 110, the first grip 1100 is rotatably connected to the base 1300, and a part of the first grip 1100 passes through the base 1300 and is connected to the first lock tongue 200, when the first grip 1100 is rotated, the first grip 1100 can drive a part of the first lock tongue 200 located outside the lockset 10 to retract into the lockset 10 or drive a part of the first lock tongue 200 inside the lockset 10 to extend out of the lockset 10.

Figure 13:
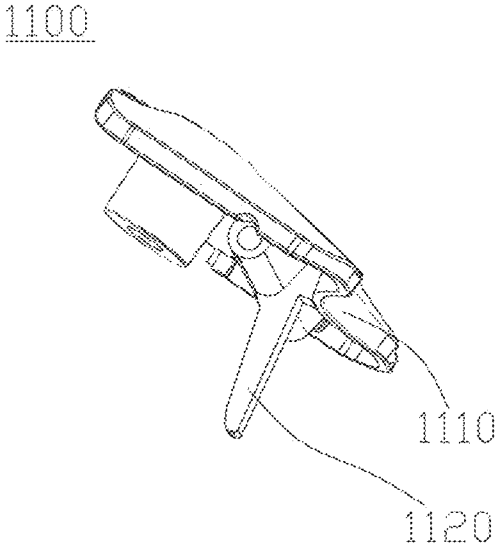
FIG. 13 is a schematic diagram of a first grip of the lockset of the present application.

In the present embodiment, referring to FIG. 13, the first grip 1100 includes a first main body portion 1110 and a second action portion 1120, wherein one end of the second action portion 1120 is connected to the first main body portion 1110, and the other end of the second action portion 1120 passes through the second housing 120 and is connected to the first lock tongue 200.

In the present embodiment, referring to FIG. 3, the lockset 10 further includes a second grip 1200, wherein the second grip 1200 is arranged on a side of the first housing 1100 away from the base 1300, the second grip 1200 is rotatably connected to the first housing 110, and a part of the second grip 1200 passes through the first housing 110 and is connected to the first lock tongue 200. Since it is provided that the lockset 10 further includes the second grip 1200, wherein the second grip 1200 is arranged on a side of the first housing 1100 away from the base 1300, the second grip 1200 is rotatably connected to the first housing 110, and a part of the second grip 1200 passes through the first housing 110 and is connected to the first lock tongue 200, when the second grip 1200 is rotated, the second grip 1200 can drive a part of the first lock tongue 200 located outside the lockset 10 to retract into the lockset 10 or drive a part of the first lock tongue 200 inside the lockset 10 to extend out of the lockset 10.

Figure 14:
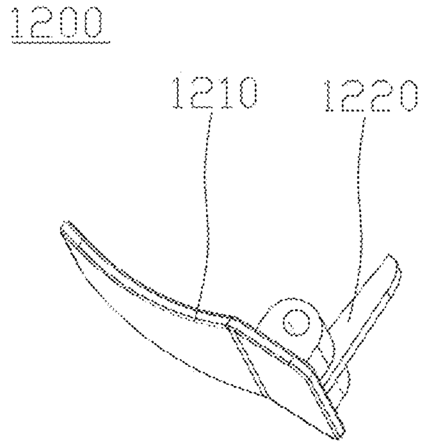
FIG. 14 is a schematic diagram of a second grip of the lockset of the present application.

In the present embodiment, referring to FIG. 14, the second grip 1200 includes a second main body portion 1210 and a third action portion 1220, wherein one end of the third action portion 1220 is connected to the second main body portion 1210, and the other end of the third action portion 1220 passes through the first housing 110 and is connected to the first lock tongue 200.

A second embodiment of the present application provides a pull-type house, including a door body and the lockset 10, wherein the lockset 10 is mounted on the door body. The lockset 10 includes a shell 100, a first lock tongue 200, a second lock tongue 300, a driving assembly 400, a transmission assembly 500 and a damping assembly 600; the shell 100 includes a first housing 110 and a base 1300 connected to the first housing 110, wherein the base 1300 is provided with a first mounting hole 1310; the first lock tongue 200 is arranged on the base 1300; the second lock tongue 300 is arranged on the base 1300, and the second lock tongue 300 is located on a side of the first lock tongue 200 close to the first mounting hole 1310; the driving assembly 400 is arranged on the base 1300; the transmission assembly 500 is connected to the driving assembly 400 and the second lock tongue 300, and the transmission assembly 500 is used to drive a part of the second lock tongue 300 to extend out of the lockset 10 or to drive a part of the second lock tongue 300 located outside the lockset 10 to retract into the lockset 10 under the drive of the driving assembly 400; and the damping assembly 600 is arranged in the first mounting hole 1310, and a part of the damping assembly 600 extends out of the first mounting hole 1310 and is abutted against the second lock tongue 300.

Pull-type houses are widely applied in outdoor camping and mobile living due to their flexibility and portability. During a driving process of the pull-type house, a lock tongue of the lockset 10 retracts into the lockset 10 due to the violent vibration of a vehicle, resulting in low stability of the lockset 10 and making a door body of the pull-type house easily opened accidentally. Therefore, the embodiment of the present application provides a lockset 10. Since it is provided that the lockset 10 includes a shell 100, a second lock tongue 300 and a damping assembly 600 and also that the shell 100 includes a first housing 110 and a base 1300 connected to the first housing 110, wherein the base 1300 is provided with a first mounting hole 1310, the damping assembly 600 is arranged in the first mounting hole 1310, and a part of the damping assembly 600 extends out of the first mounting hole 1310 and is abutted against the second lock tongue 300, the damping assembly 600 can generate a preset size of resistance to act on the second lock tongue 300, and this resistance can limit the second lock tongue 300 from retracting into the lockset 10 if a vehicle vibrates violently, thereby improving the stability of the lockset 10 and being conducive to improving the problem that the door body of the pull-type house is prone to be opened accidentally.

What is claimed is:

1. A lockset, comprising:

a shell, the shell including a first housing and a second housing connected to the first housing;

a base, the base being arranged in the shell, and the base being provided with a first mounting hole;

a first lock tongue, the first lock tongue being arranged on the base, and a part of the first lock tongue extending out of the shell;

a second lock tongue, the second lock tongue being arranged on the base, the second lock tongue being located on a side of the first lock tongue close to the first mounting hole, and a part of the second lock tongue extending out of the shell;

a driving assembly, the driving assembly being arranged on the base;

a transmission assembly, the transmission assembly being connected to the driving assembly and the second lock tongue, and the transmission assembly being used to drive a part of the second lock tongue to extend out of the lockset or to drive a part of the second lock tongue located outside the lockset to retract into the lockset under the drive of the driving assembly; and a damping assembly, the damping assembly being arranged in the first mounting hole, and a part of the damping assembly extending out of the first mounting hole and being abutted against the second lock tongue;

wherein the transmission assembly comprises a gear transmission part and a linkage transmission part, wherein the linkage transmission part is connected to the second lock tongue and the gear transmission part in a transmission manner, and the driving assembly is connected to the gear transmission part in a transmission manner;

the gear transmission part comprises a first gear and a second gear, and the linkage transmission part comprises a first linkage and a second linkage, wherein the first gear is connected to the driving assembly, the second gear is connected to the first gear in a transmission manner, one end of the first linkage is connected to the second gear in a transmission manner, one end of the second linkage is pivotally connected to the other end of the first linkage, and the other end of the second linkage is pivotally connected to the second lock tongue;

the base is provided with a second mounting hole, and the second mounting hole is located on a side of the first linkage away from the first lock tongue; and the lockset further comprises a limiting assembly, wherein the limiting assembly is arranged in the second mounting hole, and a part of the limiting assembly extends out of the second mounting hole and is abutted against the first linkage.

2. The lockset according to claim 1, wherein the damping assembly comprises a first elastic member and a first action member, wherein the first elastic member is arranged in the first mounting hole, one end of the first elastic member is connected to an inner wall of the first mounting hole, the other end of the first elastic member is connected to the first action member, and a part of the first action member extends out of the first mounting hole and is abutted against the second lock tongue.

3. The lockset according to claim 1, wherein the limiting assembly is close to a pivotal connection between the first linkage and the second linkage.

4. The lockset according to claim 1, wherein the limiting assembly comprises a second elastic member and a first limiting member, wherein the second elastic member is arranged in the second mounting hole, one end of the second elastic member is connected to an inner wall of the second mounting hole, the other end of the second elastic member is connected to the first limiting member, and a part of the first limiting member extends out of the second mounting hole and is abutted against the first linkage.

5. The lockset according to claim 4, wherein a bump is arranged on a side of the base close to the first linkage, and the bump is directly opposite the first limiting member, wherein a part of the first linkage is located in contact with the first limiting member and the bump, and both sides of the first linkage are in contact with the first limiting member and the bump, respectively.

6. The lockset according to claim 5, wherein the thickness of an edge area on a surface of the first linkage close to the first limiting member is less than the thickness of a middle area on a surface of the first linkage close to the first limiting member.

7. The lockset according to claim 1, wherein the second housing is provided with a third mounting hole, wherein the driving assembly is arranged in the third mounting hole; and the driving assembly comprises a key lock and a latch guide shaft, wherein the key lock is arranged in the third mounting hole, the key lock is connected to one end of the latch guide shaft, the key lock is rotatably arranged at one end of the latch guide shaft away from the first housing, and the second gear is fixedly sleeved on the latch guide shaft.

8. The lockset according to claim 7, wherein a first connecting hole is formed in a side of the latch guide shaft close to the key lock, at least two limiting protrusions which are spaced apart are arranged in the first connecting hole, a first action portion is extended from a side of the key lock close to the latch guide shaft, and the first action portion is located inside the first connecting hole; and when the key lock rotates, a side wall of the first action portion is in contact with or detached from side walls of the limiting protrusions.

9. The lockset according to claim 7, further comprising a driving motor, wherein an output end of the driving motor is connected to the second gear in a transmission manner.

10. The lockset according to claim 9, further comprising a control circuit board, wherein the control circuit board is arranged in the shell, the control circuit board is electrically connected to the driving motor, and the control circuit board is provided with a wireless communication module.

11. The lockset according to claim 7, further comprising an operating handle, wherein the operating handle is arranged on a side of the first housing away from the base, and a part of the operating handle passes through the first housing and is connected to the latch guide shaft.

12. The lockset according to claim 1, further comprising a first grip, wherein the first grip is arranged on a side of the second housing away from the base, the first grip is rotatably connected to the second housing, and a part of the first grip passes through the base and is connected to the first lock tongue.

13. The lockset according to claim 12, wherein the first grip comprises a first main body portion and a second action portion, wherein one end of the second action portion is connected to the first main body portion, and the other end of the second action portion passes through the second housing and is connected to the first lock tongue.

14. The lockset according to claim 1, further comprising a second grip, wherein the second grip is arranged on a side of the first housing away from the base, the second grip is rotatably connected to the first housing, and a part of the second grip passes through the first housing and is connected to the first lock tongue.

15. The lockset according to claim 14, wherein the second grip comprises a second main body portion and a third action portion, wherein one end of the third action portion is connected to the second main body portion, and the other end of the third action portion passes through the first housing and is connected to the first lock tongue.

* * * * *